(12) United States Patent
Chen et al.

(10) Patent No.: US 11,356,367 B2
(45) Date of Patent: Jun. 7, 2022

(54) SECURE PRELOADING OF SERVERLESS FUNCTION SEQUENCES

(71) Applicant: Red Hat, Inc., Raleigh, NC (US)

(72) Inventors: Huamin Chen, Westford, MA (US); Michael Bursell, Farnborough (GB)

(73) Assignee: RED HAT, INC., Raleigh, NC (US)

( * ) Notice: Subject to any disclaimer, the term of this patent is extended or adjusted under 35 U.S.C. 154(b) by 34 days.

(21) Appl. No.: 16/691,744

(22) Filed: Nov. 22, 2019

(65) Prior Publication Data

US 2021/0160180 A1    May 27, 2021

(51) Int. Cl.
*H04L 45/74* (2022.01)
*H04L 45/00* (2022.01)
*H04L 67/02* (2022.01)
*H04L 45/302* (2022.01)

(52) U.S. Cl.
CPC .............. *H04L 45/74* (2013.01); *H04L 45/14* (2013.01); *H04L 45/22* (2013.01); *H04L 45/306* (2013.01); *H04L 67/02* (2013.01)

(58) Field of Classification Search
CPC ......... H04L 45/74; H04L 45/14; H04L 67/02; H04L 45/22; H04L 45/306
See application file for complete search history.

(56) References Cited

U.S. PATENT DOCUMENTS

| | | | | |
|---|---|---|---|---|
| 9,563,385 B1* | 2/2017 | Kowalski | ............... | G06F 3/0604 |
| 9,747,434 B1* | 8/2017 | Avital | ..................... | H04L 67/02 |
| 10,542,071 B1* | 1/2020 | Matthews | ............ | H04L 67/1014 |
| 10,684,966 B1* | 6/2020 | Hamman | ............ | G06F 13/1668 |
| 2004/0039924 A1* | 2/2004 | Baldwin | ............... | H04L 9/0894 |
| | | | | 713/189 |
| 2010/0332672 A1* | 12/2010 | Abdullah | ................ | H04L 69/26 |
| | | | | 709/230 |
| 2013/0147820 A1* | 6/2013 | Kalai | ..................... | G01C 21/32 |
| | | | | 345/522 |
| 2014/0230010 A1* | 8/2014 | Ginter | ................... | G06T 1/0021 |
| | | | | 726/1 |
| 2016/0127497 A1* | 5/2016 | Himmelreich | ...... | H04L 67/2847 |
| | | | | 709/217 |

(Continued)

OTHER PUBLICATIONS

Lin; Ping-Min, Mitigating Cold Starts in Serverless Platforms—A Pool-Based Approach, https://arxiv.org/pdf/1903.12221.pdf Published Mar. 28, 2019.

(Continued)

*Primary Examiner* — Jimmy H Tran
(74) *Attorney, Agent, or Firm* — Haynes and Boone, LLP

(57) ABSTRACT

According to one example, a method includes, with a serverless function infrastructure, associated a routing secret with a function sequence. The method further includes, with a sequence controller of the serverless function infrastructure, appending the routing secret to a header of a request to invoke a first function of the function sequence. The method further includes, with the serverless function infrastructure invoking the first function of the function sequence, in response to authenticating the routing secret in the header of the request. The method further includes, after the first function has been invoked and before the first function completes execution, with a serving controller of the serverless function infrastructure, preloading subsequent functions of the function sequence.

20 Claims, 5 Drawing Sheets

(56) References Cited

U.S. PATENT DOCUMENTS

| | | | | |
|---|---|---|---|---|
| 2016/0294605 | A1* | 10/2016 | Searle | H04L 41/082 |
| 2017/0373990 | A1* | 12/2017 | Jeuk | H04L 69/22 |
| 2018/0205637 | A1* | 7/2018 | Li | H04L 41/5058 |
| 2018/0210742 | A1* | 7/2018 | Costa | G06F 21/602 |
| 2018/0211034 | A1* | 7/2018 | Costa | G06F 9/45558 |
| 2018/0212939 | A1* | 7/2018 | Costa | H04L 63/061 |
| 2018/0212966 | A1* | 7/2018 | Costa | H04L 63/0435 |
| 2018/0212971 | A1* | 7/2018 | Costa | G06F 21/6209 |
| 2018/0295053 | A1* | 10/2018 | Leung | H04L 45/38 |
| 2018/0309632 | A1* | 10/2018 | Kompella | H04L 41/50 |
| 2019/0028552 | A1 | 1/2019 | Johnson et al. | |
| 2019/0075154 | A1 | 3/2019 | Zhang et al. | |
| 2019/0166221 | A1 | 5/2019 | Shimamura et al. | |
| 2019/0182128 | A1* | 6/2019 | Shimamura | H04L 41/145 |
| 2019/0373521 | A1* | 12/2019 | Crawford | H04L 67/10 |
| 2020/0050386 | A1* | 2/2020 | Natarajan | G06F 3/067 |
| 2020/0162428 | A1* | 5/2020 | Clark | G06F 21/566 |
| 2020/0204618 | A1* | 6/2020 | Agarwal | H04L 9/0643 |
| 2020/0272499 | A1* | 8/2020 | Feng | H04L 41/5054 |
| 2020/0322413 | A1* | 10/2020 | Saraf | H04L 67/2842 |
| 2020/0389401 | A1* | 12/2020 | Enguehard | H04L 45/64 |
| 2021/0029163 | A1* | 1/2021 | Behl | H04L 63/0263 |
| 2021/0200830 | A1* | 7/2021 | Shribman | H04L 67/146 |

OTHER PUBLICATIONS

Eyk; Erwin-Van; Four Techniques Serverless Platforms Use to Balance Performance and Cost, https://www.infoq.com/articles/serverless-performance-cost/ Published Feb. 13, 2019.

Mohan; Anup, Agile Cold Starts for Scalable Serverless, https://www.usenix.org/system/fiies/hotcloud19-paper-mohan.pdf.

* cited by examiner

SECURE PRELOADING OF SERVERLESS FUNCTION SEQUENCES

BACKGROUND

The present disclosure relates generally to serverless function infrastructure systems, and more particularly, systems and methods for securely preloading serverless function sequences.

Serverless function infrastructure is a computing model in which the developer does not have to be concerned with the conventional client server relationship. Rather, a developer may create a set of functions that are designed to execute in a particular sequence. For example, a payment processing application may have a function for obtaining a user's payment information, another function for verifying that payment information, another function for processing that payment information, and another function for notifying the user of the successful completion of that process.

Each of the functions may be processed by a serverless function infrastructure in a manner transparent to the developer. The serverless function infrastructure may include a number of storage nodes to store code associated with the functions as well as a number of processing nodes to execute the functions. The serverless function infrastructure may also include various control elements such as a routing controller, a sequence controller, and a serving controller to operate and manage the execution of function sequences.

SUMMARY

According to one example, a method includes, with a serverless function infrastructure, associated a routing secret with a function sequence. The method further includes, with a sequence controller of the serverless function infrastructure, appending the routing secret to a header of a request to invoke a first function of the function sequence. The method further includes, with the serverless function infrastructure invoking the first function of the function sequence, in response to authenticating the routing secret in the header of the request. The method further includes, after the first function has been invoked and before the first function completes execution, with a serving controller of the serverless function infrastructure, preloading subsequent functions of the function sequence.

According to one example, a method performed by a serverless function infrastructure includes receiving a request to execute a first function, the first function being a first of a chain of functions. The method further includes executing the first function and, before completing execution of the first function, preloading subsequent functions in the chain of functions. The method further includes, upon completion of the first function, invoking a subsequent function in the chain of functions, the invoking comprising placing a routing secret in a header of a request to invoke the subsequent function in the chain of functions.

According to one example, a system includes a processor and a memory comprising machine readable instructions that when executed by the processor, cause the system to receive a request to execute a first function, the first function being a first of a chain of functions. The system is further to execute the first function and, before completing execution of the first function, preload subsequent functions in the chain of functions. The system is further to, upon completion of the first function, invoke a subsequent function in the chain of functions, the invoking comprising placing a routing secret in a header of a request to invoke the subsequent function in the chain of functions.

Figure 1:
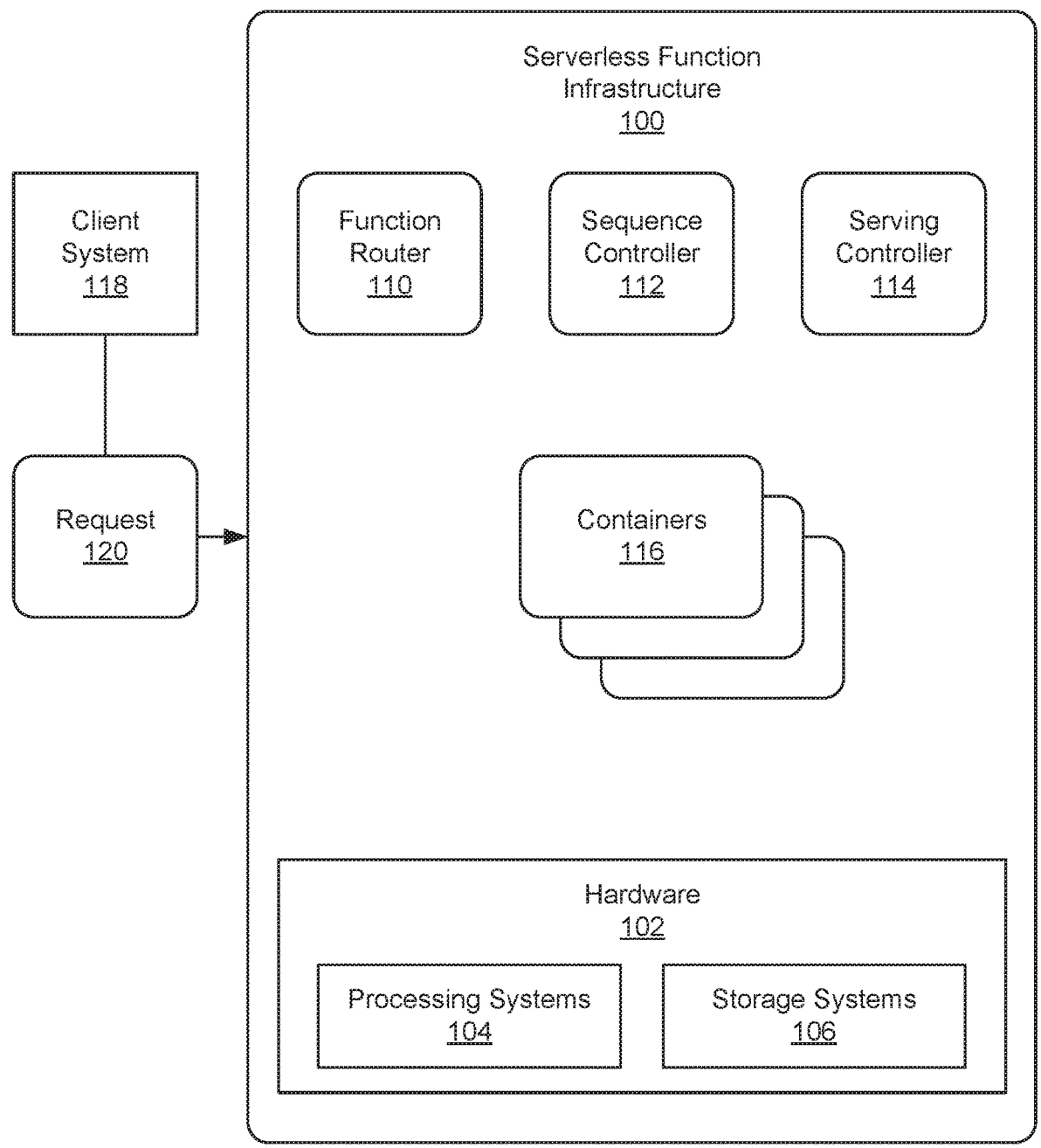
FIG. 1 is a diagram showing an illustrative serverless function infrastructure, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, serverless function infrastructure is a computing model in which the developer does not have to be concerned with the conventional client server relationship. Such a model provides a number of benefits, such as easing a developer's task of managing client server relationships. However, the serverless function infrastructure model may have increased latency because it may take additional time to transition from one function to another.

To address this and other challenges, the principles described herein are directed to methods and systems for securely preloading a sequence of functions in a function sequence for a serverless function infrastructure model. In one example, when a function sequence is first invoked, the serverless function infrastructure will begin warming up and preloading subsequent functions in the sequence, before the first sequence has completed. To warm up and preload a function, the serverless function infrastructure management components may start up a container and load the function within that container. Thus, when it is that function's turn to be executed, it is ready for such execution.

Furthermore, to provide more security to the preloaded and warmed up functions, a routing secret may be provided to a function sequence at creation. This routing secret may be, for example, a key value pair. When the serverless function infrastructure management components call the warmed up and preloaded functions, they may do so with a hypertext transport protocol (HTTP) request. The header of that HTTP request may include the routing secret. Thus, the HTTP request may be verified by management components such as a routing controller of the serverless function infrastructure.

By using principles described herein, programs that are designed for and executed by a serverless function architecture will be able to execute more quickly and efficiently. Specifically, by preloading subsequent functions, there will be less system latency when such programs are executed. And, the preloaded functions will be less susceptible to malicious requests to be invoked with false data.

FIG. 1 is a diagram showing an illustrative serverless function infrastructure 100. According to the present example, the serverless function infrastructure 100 includes various management components such as a function router 110, a sequence controller 112, and a serving controller 114. The management components are responsible for initiating containers 116 to run functions. The serverless function infrastructure 100 may be executed by hardware such as processing systems 104 and storage systems 106.

The serverless function infrastructure 100 may receive requests 120 from a client system 118. The client system 118 may be a user's computing device such as a mobile phone, a laptop computer, or a desktop computer. In one example, a user may use a web browser application to visit the website of a particular entity, such as a merchant. The user may then select items for purchase, provide shipping and payment information, and click a button labeled "pay now." When the user clicks that button, the web browser sends a request 120 (e.g., an HTTP request) to an application managed by the serverless function infrastructure. That application may be embodied as a predefined sequence of functions. Execution of those functions may be managed by a function router 110.

The function router 110 manages the functions within the serverless function infrastructure 100. One example of a function router 110 is Istio. The function router 110 may help provide security by ensuring that each function within a predefined sequence of functions is called correctly and is not being called from some outside source. This may be done by using a routing secret as described above. Specifically, when the routing function receives the initial request 120 from the client system 118, it may create the sequence and generate a routing secret to be used for each function within the sequence.

The function router 110 works with other management components such as the sequence controller 112 and the serving controller 114. In some examples, the sequence controller 112 and the serving controller 114 may be integrated with the function router 110. In some examples, the sequence controller 112 and the serving controller 114 may be separate software modules that work with the routing controller 110.

The sequence controller 112 manages the flow of functions within a function sequence. For example, when one function completes, it will notify the sequence controller 112. The sequence controller 112 may then notify the subsequent function of its turn. This may be done, for example, through use of HTTP requests. In other words, when one function completes, it sends an HTTP message to the sequence controller 112. The sequence controller 112 then sends an HTTP message to invoke the next function in the sequence.

The serving controller 114 manages the containers 116 on which the functions run. A container 116 is an isolated virtual computer that, from the perspective of the application or function running thereon, is a real computer. Containers may be started up and torn down on demand as needed. For example, as demand for processing increases, more containers can be started up and loaded with applications to perform such processing. When the demand decreases, unused containers may be torn down. The serving controller 114 is responsible for starting up and tearing down containers.

The serverless function infrastructure 100 relies on physical components for execution. Specifically, the serverless function infrastructure uses various storage systems 106 which may include volatile memory modules such as Random Access Memory (RAM) and non-volatile memory devices such as hard drives. The RAM modules and hard drives may be embodied on one or more computing systems such as servers in a datacenter. The storage systems 106 may store data for use by or created by the functions that run within the serverless function infrastructure 100. The storage systems 106 may also store the code associated with those functions for execution by physical processing systems 104.

The physical processing systems 104 include processing devices designed to execute machine-readable instructions. The processing systems 104 may also be embodied on one or more physical computing systems such as servers in a datacenter. While the serverless function infrastructure may utilize physical servers, it is serverless in the sense that from a software perspective, the details of client server interactions are abstracted.

Figure 2:
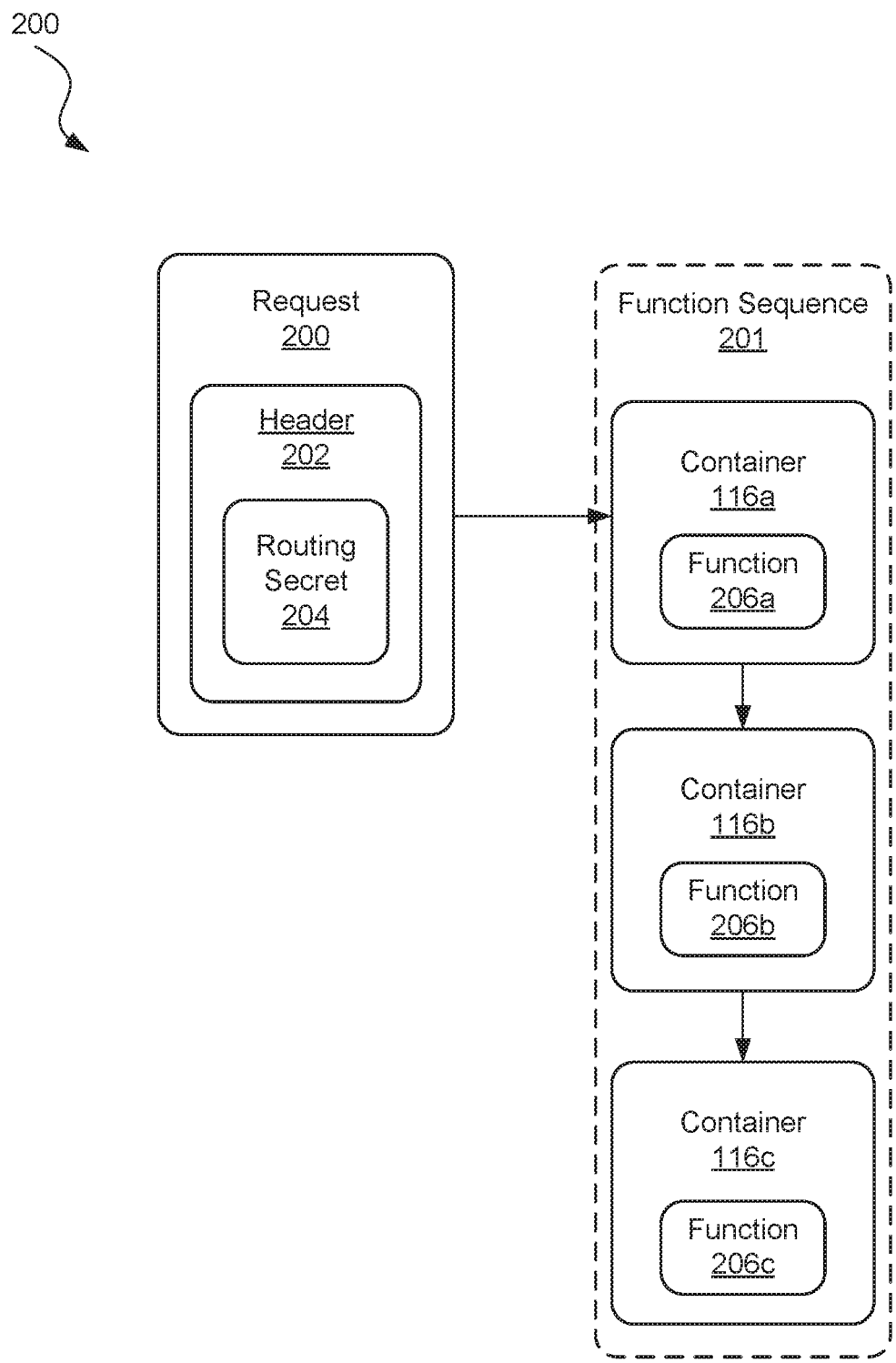
FIG. 2 is a diagram showing an illustrative function sequence, according to one example of principles described herein.

FIG. 2 is a diagram showing an illustrative function sequence. According to the present example, after the routing controller 110 receives a request 120 from a client system, the routing controller invokes a function sequence 201. The function sequence is a series of functions 206a, 206b, 206c, each of which may be executed on a separate container 116a, 116b, 116c.

When the routing controller first invokes the function sequence 201, it may generate a routing secret 204. In one example, the routing secret may be a key value pair. The routing secret may also have various pieces of information embedded therein. For example, the routing secret 204 may be a symmetric cryptographic hash of information associated with the function sequence. This information may be a unique identifier of the sequence or may include routing information, such as identification of proper calling sequences.

This routing secret 204 may then be embedded in a header 202 of an HTTP request 200 that is used to start each function. For example, the HTTP request 200 that is used to start the first function 206a in the sequence 201 may have the routing secret embedded within the header 202 used to start that function 206a. As will be explained in further detail below, the request to start each function 206a, 206b, 206c may have the routing secret 204 embedded therein.

Figure 3:
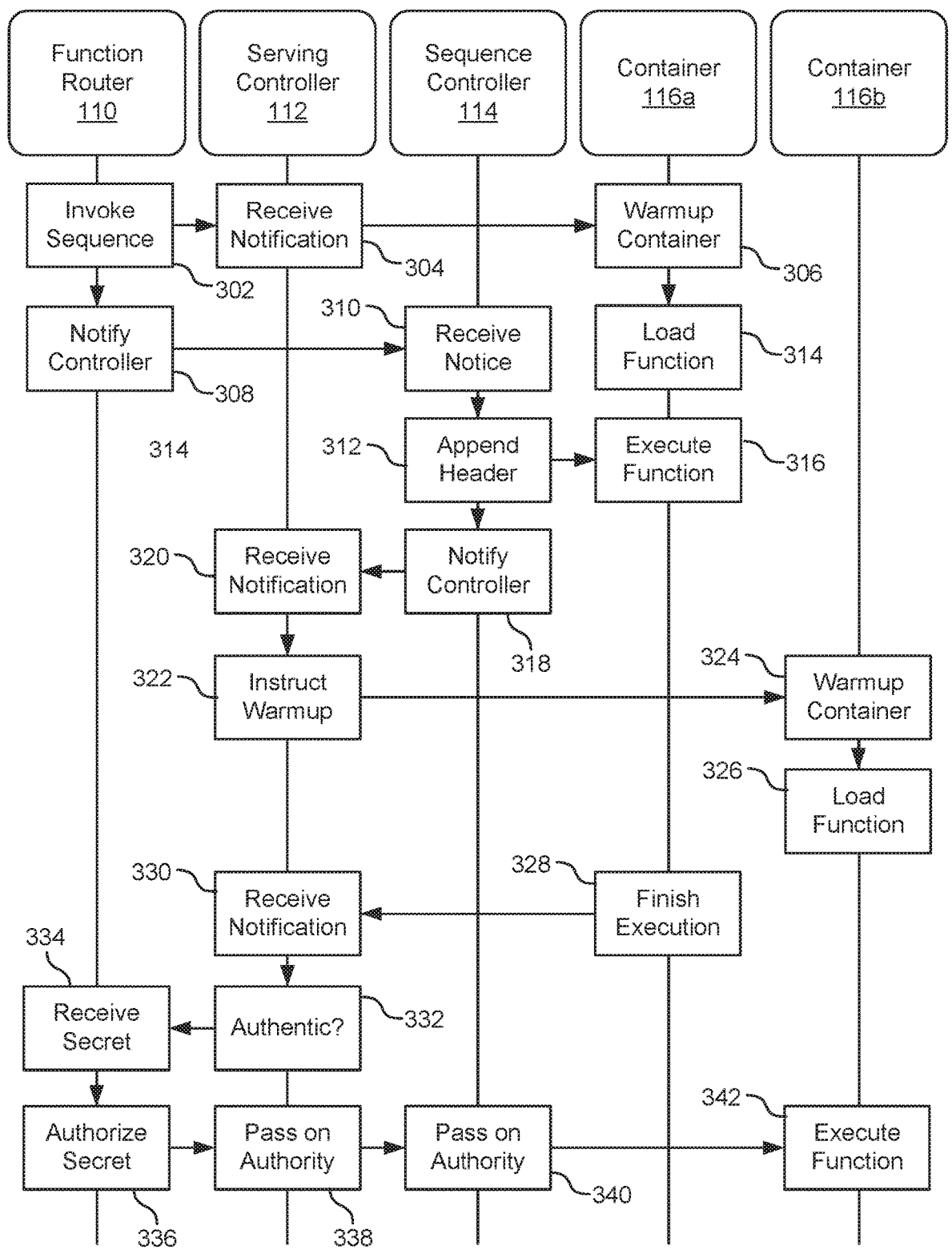
FIG. 3 is a diagram showing an illustrative process for securely preloading serverless function sequences, according to one example of principles described herein.

FIG. 3 is a diagram showing an illustrative process for securely preloading serverless function sequences. According to the present example, at process 302, the function router 110 receives a request from a client system (e.g., 118). This request triggers a function sequence (e.g., 201). The function router 110 then generates and assigns a routing secret (e.g., 204) to that function sequence. As described above, the routing secret may be a key value pair.

To begin executing the sequence, the function router 110 notifies the serving controller 112 at process 304. At process 306, the serving controller 112 receives the notification from the routing controller. Thus, the serving controller 112 may then begin the process to start up a container 116a for the first function within the function sequence. At process 308 the first container 116a is initiated and warmed up. At process 310, the first function (e.g., 206a) is loaded on the first container 116a. In other words, the machine-readable instructions for the first function may be loaded from a non-volatile memory storage device to RAM associated with the container 116a. Thus, the first function is ready for execution when it is instructed to do so.

In addition to causing the container 116a for the first function in the sequence to be started up, the function router 110, at process 312, notifies the sequence controller 114 that the function sequence is to begin. The function router 110 may also provide the sequence controller 114 with the routing secret.

After receiving that notification from the function router at process 310, the sequence controller 114 invokes the first function at process 316. For example, the sequence controller creates and sends an HTTP message to the container 116a. The HTTP message is used to cause the first function loaded on the first container 116a to start execution.

At some time during invocation of the first function, the serving controller 112 also causes subsequent functions to be loaded at process 322. More specifically, the serving controller 112 starts up container 116b, as well as containers for any further subsequent functions (not shown). After starting up the container 116b at process 324, the next function in the sequence (e.g., 206b) is loaded onto that container 116b at function 326 and is thus ready for execution.

At some point later, the first function on the first container 116a finishes execution at process 328. After finishing execution, the sequence controller is notified at process 330. The sequence controller 112 then intends to instruct the preloaded function within container 116b to begin loading. Because that function was preloaded, it is ready to go and does not have to wait to startup up and load before starting execution. However, for security purposes, the message that is used to start execution of the second function on the second container 116b is first authenticated.

To authenticate the function, the sequence controller 114, at process 332, appends the routing secret to the header of the HTTP message used to start execution of the function. The routing secret is then inspected by function router 110 to ensure authenticity. In some examples, function routers, under the control of the function controller may perform this inspection. In more detail, the function router 110 intercepts the HTTP message at process 334. The function router 110 may then authorize the HTTP message and allow it to pass to the container 116b if it is valid. If the routing secret is absent or not valid, then the function controller 110 or function router will prevent the HTTP message from being sent to the container 116b. When the container 116b does receive the HTTP message, it will begin execution of the preloaded function. Upon completion of execution, the container 116b will notify the sequence controller 114 and the process will repeat for each function within the function chain. Specifically, the sequence controller will append the routing secret to each message used to start execution of the next function. That message will then be inspected to insure authenticity.

In this manner, the preloaded functions are less susceptible to unauthorized use. For example, the preloaded functions are less susceptible to speculative attacks that send HTTP messages to various containers in hopes of getting a particular response.

In addition to the techniques described above in relation to the routing secret, other mechanisms may be used to secure the preloaded functions. For example, hypertext transfer protocol secure (HTTPS) may be used to communicate with the various containers. For example, the messages used by the sequence controller 114 to initiate execution of a preloaded function may use HTTPS. Additionally, or alternatively, the serverless function infrastructure may be configured to establish secure tunnels between components and containers. For example, the function controller may establish Transport Layer Security (TLS) tunnels between the containers 116 and the sequence controller 114. Thus, any HTTP messages being sent therebetween may be encrypted and less susceptible to attack.

Figure 4:
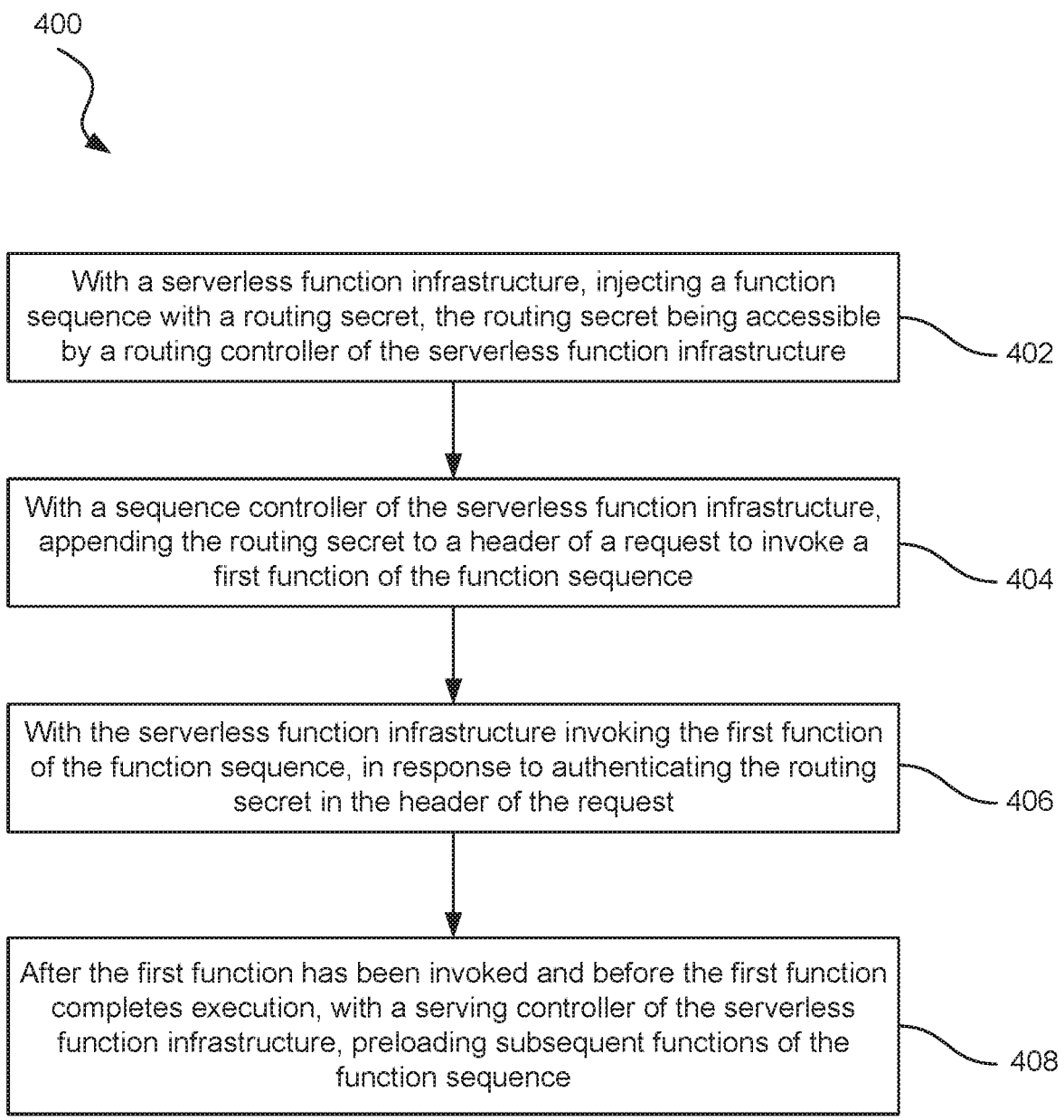
FIG. 4 is a flowchart showing an illustrative method for securely preloading serverless function sequences, according to one example of principles described herein.

FIG. 4 is a flowchart showing an illustrative method for securely preloading serverless function sequences. According to one example, the method 400 includes a process 402 for, with a serverless function infrastructure, associating a routing secret with a function sequence. In some examples, the routing secret may be a key value pair. The routing secret may also have various pieces of information embedded therein. In other words, the routing secret may be a symmetric cryptographic hash of information associated with the function sequence. This information may be a unique identifier of the sequence or may include routing information, such as identification of proper calling sequences.

The method 400 further includes a process 404 for, with a sequence controller of the serverless function infrastructure, appending the routing secret to a header of a request to invoke a first function of the function sequence. As described above, the sequence controller is responsible for managing the order of functions in the function sequence. Specifically, the sequence controller may use an HTTP request to start a function. When that function finishes execution, it may report that completion to the sequence controller. The sequence controller may then send another HTTP request to start the next function in the sequence.

The method 400 further includes a process 406 for, with the serverless function infrastructure invoking the first function of the function sequence, in response to authenticating the routing secret in the header of the request. More specifically, the serverless function infrastructure may include function routers that may inspect the HTTP request used to start the function. Those function routers, which may be associated with the function controller, may ensure that the routing secret within the HTTP requests being sent to the first function are authentic. In other words, the serverless function infrastructure may validate the requests used to start the functions within function sequences being executed within the infrastructure.

The method 400 further includes a process 408 for, after the first function has been invoked and before the first function completes execution, with a serving controller of the serverless function infrastructure, preloading subsequent functions of the function sequence. As described above, preloading a function may involve starting up a container within the serverless function infrastructure. That container may then be loaded with the machine-readable instructions for the function. Thus, those subsequent functions are ready for execution when invoked. And, because the serverless function infrastructure may use the security features described above, these preloaded functions are less susceptible to unauthorized use.

Figure 5:
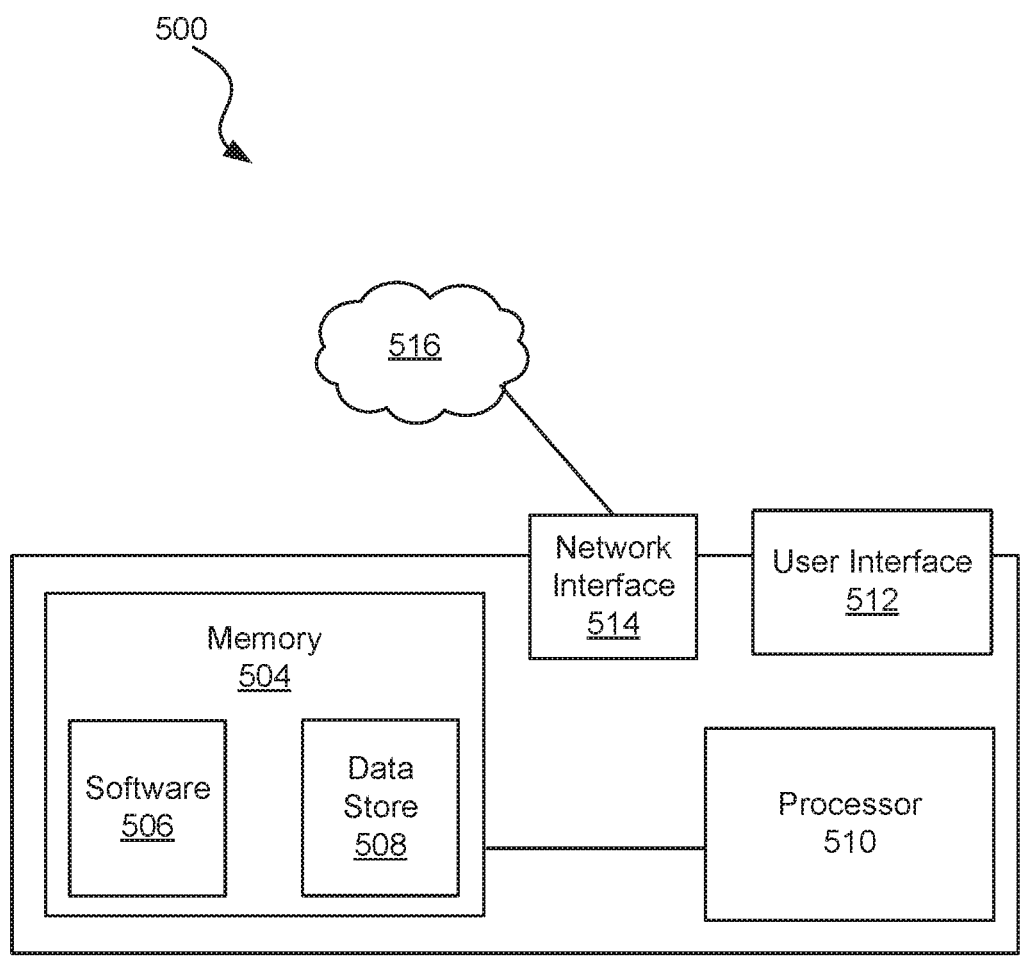
FIG. 5 is a diagram showing an illustrative computing system that may be used to perform the principles described herein.

FIG. 5 is a diagram showing an illustrative computing system that may be used to perform the principles described herein. For example, the computing system 500 may be used to perform the functions performed in methods 300 and 400. Other functions described herein may also be performed by computing systems such as computing system 500. According to certain illustrative examples, the computing system 500 includes a memory 504 which may include software 506 and a data store 508. The processing system 500 also includes a processor 510, a network interface 514, and a user interface 512.

The memory 504 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. In some examples, the computing system 500 may be associated with a user. In such case, the software 506 may be an application to render web content, such as a browser. The software 506 may include machine readable instructions of a computer program product that when executed, perform the functions described above.

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transitory, tangible, machine readable media that include executable code that when run by one or more processors may cause the one or more processors to perform the processes of methods as described above. Some common forms of machine-readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
with a serverless function infrastructure, associating a routing secret with a function sequence, the routing secret comprising a hash of information associated with the function sequence;
with a sequence controller of the serverless function infrastructure, appending the routing secret to a header of a request to invoke a first function of the function sequence;
with the serverless function infrastructure, invoking the first function of the function sequence, in response to authenticating the routing secret in the header of the request; and
after the first function has been invoked and before the first function completes execution, with a serving controller of the serverless function infrastructure, preloading subsequent functions of the function sequence.

2. The method of claim 1, wherein the first function is run on a container within the serverless function infrastructure.

3. The method of claim 1, wherein the header includes a hypertext transfer protocol header.

4. The method of claim 1, wherein the serverless function infrastructure uses hypertext transfer protocol secure to communicate between nodes in the infrastructure.

5. The method of claim 1, further comprising, establishing transport layer security (TLS) connections between nodes in the serverless function infrastructure.

6. The method of claim 1, wherein preloading the subsequent functions comprises starting up containers for those functions and loading the functions within the containers.

7. The method of claim 1, wherein the routing secret comprises a key value pair.

8. A method performed by a serverless function infrastructure, the method comprising:
receiving a request to execute a first function, the first function being a first of a chain of functions;
executing the first function;
before completing execution of the first function, preloading subsequent functions in the chain of functions;
upon completion of the first function, invoking a subsequent function in the chain of functions, the invoking comprising placing a routing secret in a header of a request to invoke the subsequent function in the chain of functions, the routing secret comprising a hash of information associated with the function sequence; and
in response to authenticating the routing secret in the header of the request, executing the subsequent function.

9. The method of claim 8, further comprising, executing the first function within a container of the serverless function infrastructure.

10. The method of claim 8, further comprising, executing the subsequent function within a container of the serverless function infrastructure.

11. The method of claim 8, further comprising, establishing secure tunnels between nodes of the serverless function infrastructure.

12. The method of claim 8, wherein the request comprises a hypertext transfer protocol request.

13. The method of claim 8, wherein the header comprises a hypertext transfer protocol secure header.

14. The method of claim 8, wherein the routing secret has the routing sequence embedded therein.

15. A system comprising:
a processor; and
a memory comprising machine readable instructions that when executed by the processor, cause the system to:
receive a request to execute a first function, the first function being a first of a chain of functions;
execute the first function;
before completing execution of the first function, preload subsequent functions in the chain of functions;

upon completion of the first function, invoke a subsequent function in the chain of functions, the invoking comprising placing a routing secret in a header of a request to invoke the subsequent function in the chain of functions, the routing secret comprising a hash of information associated with the function sequence; and in response to authenticating the routing secret in the header of the request, execute the subsequent function.

16. The system of claim 15, wherein the first function is run on a container within the serverless function infrastructure.

17. The system of claim 15, wherein the header includes a hypertext transfer protocol header.

18. The system of claim 15, further comprising, establishing transport layer security (TLS) connections between nodes in the serverless function infrastructure.

19. The system of claim 15, wherein preloading the subsequent functions comprises starting up containers for those functions and loading the functions within the containers.

20. The method of claim 15, wherein the routing secret comprises a key value pair.

\* \* \* \* \*